US012367364B2

(12) United States Patent
Nakayama et al.

(10) Patent No.: US 12,367,364 B2
(45) Date of Patent: Jul. 22, 2025

(54) INFORMATION CODE DISPLAY DEVICE AND INFORMATION CODE DISPLAY SYSTEM

(71) Applicant: DENSO WAVE INCORPORATED, Aichi (JP)

(72) Inventors: Shin Nakayama, Chita-gun (JP); Takao Ushijima, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 18/739,564

(22) Filed: Jun. 11, 2024

(65) Prior Publication Data

US 2024/0330636 A1    Oct. 3, 2024

Related U.S. Application Data

(63) Continuation of application No. PCT/JP2022/044583, filed on Dec. 2, 2022.

(30) Foreign Application Priority Data

Dec. 28, 2021    (JP) ................... 2021-213918

(51) Int. Cl.
*G06K 19/06*    (2006.01)
*G06K 7/14*    (2006.01)

(52) U.S. Cl.
CPC ........ *G06K 19/06112* (2013.01); *G06K 7/146* (2013.01); *G06K 19/06037* (2013.01); *G06K 7/1417* (2013.01)

(58) Field of Classification Search
CPC ....... G06K 19/06112; G06K 19/06037; G06K 7/146; G06K 7/1417
See application file for complete search history.

(56) References Cited

U.S. PATENT DOCUMENTS

| | | |
|---|---|---|
| 2014/0205136 A1 | 7/2014 | Oshima et al. |
| 2018/0131976 A1* | 5/2018 | Zabelin ............... H04N 21/812 |
| 2022/0406032 A1 | 12/2022 | Sekikawa et al. |

FOREIGN PATENT DOCUMENTS

WO    2018/167870 A1    9/2018

* cited by examiner

*Primary Examiner* — Laura A Gudorf
(74) *Attorney, Agent, or Firm* — Oliff PLC

(57) ABSTRACT

A display control unit executes an information code display process in which a display unit is controlled to change a luminance of a light color display area, in which light color cells are to be displayed, from a luminance of a predetermined initial display screen on the display unit in a certain direction, and to change a luminance of a dark color display area, in which dark color cells are to be displayed, from the luminance of the predetermined initial display screen in an opposite direction to the certain direction.

8 Claims, 12 Drawing Sheets

INFORMATION CODE DISPLAY DEVICE AND INFORMATION CODE DISPLAY SYSTEM

CROSS REFERENCE TO RELATED APPLICATIONS

The present application is a continuation application of International Patent Application No. PCT/JP2022/044583 filed on Dec. 2, 2022, which designated the U.S. and claims the benefit of priority from Japanese Patent Application No. 2021-213918 filed on Dec. 28, 2021, and all the contents of the application are incorporated by reference.

TECHNICAL FIELD

The present disclosure relates to an information code display device and an information code display system that display an information code.

BACKGROUND

In recent years, an event camera (event-based camera) has been known as a technology for generating an image of an object to be captured at a higher speed. The event camera was developed based on the structure of the retina of living organisms and outputs a difference in luminance.

SUMMARY

According to at least one embodiment of the present disclosure, an information code display device for displaying an information code in which light color cells and dark color cells arranged, the information code display device comprising:
  a display unit having a screen on which the information code is to be displayed; and
  a display control unit configured to control a display content displayed on the display unit, wherein
  the display control unit is configured to control the display unit to:
    change a luminance of a light color display area, in which the light color cells are to be displayed, from a luminance of a predetermined initial display screen in a certain direction, and
    change a luminance of a dark color display area, in which the dark color cells are to be displayed, from the luminance of the predetermined initial display screen in an opposite direction to the certain direction.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
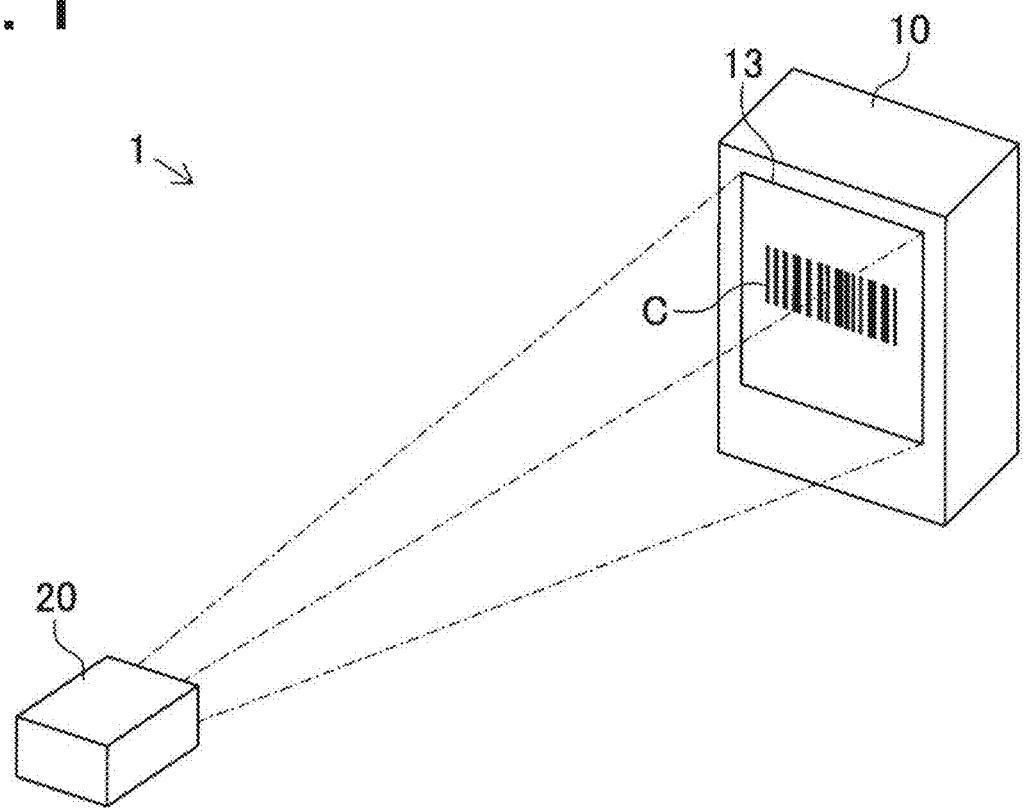
FIG. 1 is a diagram illustrating an information code display device and an information code display system according to a first embodiment.

To begin with, examples of relevant techniques will be described. An event camera (event-based camera) according to a comparative example generates an image of an object to be captured at a higher speed. The event camera includes an imaging element that outputs event data corresponding to a pixel that has changed in luminance via receiving light. The event data includes two-dimensional point position data by which the position of the pixel is identified, timestamp and polarity of the change in luminance. Due to this configuration, the event camera has a characteristic that, unlike a general camera, it does not output pixel information with no change in luminance, that is, redundant data. Therefore, an image of the object to be captured can be generated more quickly. Furthermore, it may be possible to realize a camera having advantages such as high temporal resolution, high dynamic range, reduced data consumption, and reduced power consumption. In particular, an image of an information code is restored by estimating a luminance of each cell that forms the information code based on event data that is output data corresponding to pixels that change in luminance according to relative movement between the event camera and the information code.

However, when capturing the image of the information code with the event camera, relative movement between the event camera and the information code is necessary to cause the change in luminance. In this case, since output is only event data of points where a luminance change occurs at the time of the relative movement, a technique to restore the information code is required at a stage before acquisition of information of the information code. Furthermore, when the information code does not move relative to the event camera, there is no change in luminance, the information code cannot be captured by the event camera, and the information code cannot be restored. That is, the event camera cannot capture the information code in a stationary state, which should be able to be captured most accurately by a general camera (frame-based camera) different from the event camera.

In contrast, according to the present disclosure, a device, system, or method that can display a decodable information code even if relative movement between the information code and an event camera is insufficient.

One aspect of the present disclosure is an information code display device for displaying an information code in which light color cells and dark color cells arranged, the information code display device comprising:

a display unit having a screen on which the information code is to be displayed; and a display control unit configured to control a display content displayed on the display unit, wherein the display control unit is configured to control the display unit to:

change a luminance of a light color display area, in which the light color cells are to be displayed, from a luminance of a predetermined initial display screen in a certain direction, and change a luminance of a dark color display area, in which the dark color cells are to be displayed, from the luminance of the predetermined initial display screen in an opposite direction to the certain direction.

In the present disclosure, the display control unit controls the display unit to change the luminance of the light color display area, in which the light color cells are to be displayed, from the luminance of the predetermined initial display screen in the certain direction. The display control unit controls the display unit to change the luminance of the dark color display area, in which the dark color cells are to be displayed, from the luminance of the predetermined initial display screen in the opposite direction.

As a result, an event camera, whose imaging area is a display screen of the display unit, can generate event data of a positive luminance change in pixels that receive light from the light color display area where the light color cells are to be displayed, and can generate event data of a negative luminance change in pixels that receive light from the dark color display area where the dark color cells are to be displayed. Therefore, positions of the pixels where the positive luminance change has occurred and positions of the pixels where the negative luminance change has occurred allow determination of a positional relationship between the light color display area and the dark color display area. In other words, since the positional relationship between the light color cells and the dark color cells can be specified, readable image data can be generated from the information code in which the light color cells and the dark color cells are arranged. Therefore, the information code display device is capable of displaying an information code that can be captured even by the event camera when there is no relative movement between the event camera and the information code.

According to another aspect of the present disclosure, the display control unit may control the display unit to gradually change the luminance of the light color display area in the opposite direction and gradually change the luminance of the dark color display area in the certain direction in response to either a highest luminance or a lowest luminance being reached by the luminance of the light color display area that has been gradually changed in the certain direction or the luminance of the dark color display area that has been gradually changed in the opposite direction.

In addition, the display control unit may control the display unit to gradually change the luminance of the light color display area in the certain direction and gradually change the luminance of the dark color display area in the opposite direction in response to either the highest luminance or the lowest luminance being reached by the luminance of the light color display area that has been gradually changed in the opposite direction or the luminance of the dark color display area that has been gradually changed in the certain direction.

As a result, in the light color display area and the dark color display area, the luminance change in which gradients of the luminance change are opposite in the light/dark direction occurs repeatedly. This repetition of the luminance change makes it possible to appropriately maintain a display state in which the information code can be captured and read by the event camera.

According to another aspect of the present disclosure, the light color display area and the dark color display area on the predetermined initial display screen may be set to have a first luminance difference to be distinguishable in luminance from each other.

Accordingly, an image can be captured by not only the event camera but also a general camera (frame-based camera) different from the event camera such that the light color display area and the dark color display area are distinguishable. Therefore, convenience of the information code displayed on the screen can be improved.

According to another aspect of the present disclosure, the light color display area and the dark color display area on the predetermined initial display screen may be set to have a luminance difference that is equal to or less than a second luminance difference at which the light color display area and the dark color display area are indistinguishable in luminance. The display control unit may be configured to control the display unit to change the luminance of the light color display area and the luminance of the dark color display area within a range between a highest luminance and a lowest luminance. A luminance difference between the highest luminance and the lowest luminance is less than the second luminance difference.

Accordingly, while light color cells and dark color cells can be accurately recognized in images captured by the event camera, light color cells and dark color cells are difficult to be accurately recognized in images captured by a general camera (frame-based camera) that is different from the event camera. Therefore, since an information code that can be recognizably captured only by the event camera can be displayed, the information code displayed on the screen can be used as a highly confidential information code for authenticity determination, etc.

According to another aspect of the present disclosure, the information code displayed on the information code display device having the above-described configuration may be captured by the event camera. Therefore, the information code displayed on the screen of the information code display device can be captured by the event camera without moving the information code display device and the event camera relative to each other.

According to another aspect of the present disclosure, the image data processing device may be configured to enable predetermined authentication based on the event camera detecting a luminance change in the light color display area and the dark color display area multiple times. Accordingly, the information code can be prevented from being erroneously read due to an accidental change in luminance.

According to another aspect of the present disclosure, the display control unit may create a specific change pattern in luminance by controlling the luminance of the light color display area and the luminance of the dark color display area, and an image data processing device enables a specified authentication based on the event camera detecting the specific change pattern in luminance. The information code can be read only when the image processing device recognizes the specific change pattern in luminance previously specified by the display control unit. This can improve the accuracy of authentication.

First Embodiment

Hereinafter, a first embodiment in which an information code display device and an information code display system of the present disclosure are implemented will be described with reference to the accompanying drawings.

As shown in FIG. 1, an information code display device 10 according to the present embodiment displays an information code on a screen. The information code is, for example, a barcode or a QR code (registered trademark), and is made up of light color cells and dark color cells arranged in a one-dimensional or two-dimensional manner. An information code display system 1 according to the present embodiment includes an information code display device 10 that is a stationary device, an event camera (event-based camera) 20 that captures an image of the information code displayed on the screen of the information code display device 10, and an image data processing device 30 (FIG. 6) that decodes the information code using the captured image of the information code obtained from the event camera 20. The information code display device 10 may be a portable device including a smartphone. The information code display system 1 can be adopted in a system in which, for example, when making a payment using an information code using a smartphone, an information code in which the payment information is encoded is displayed on the screen of the information code display device 10, and the payment is made by capturing the image of the information code with the event camera 20 and optically reading it.

Figure 2:
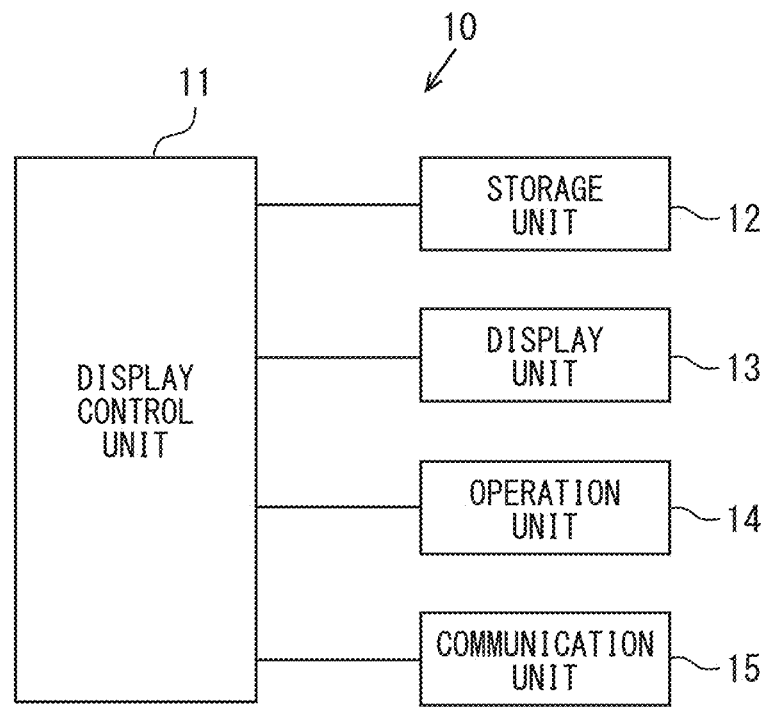
FIG. 2 is a block diagram illustrating a schematic configuration of an information code display device shown in FIG. 1.

As shown in FIG. 2, the information code display device 10 includes a display control unit 11, a display storage unit 12, a display unit 13, an operation unit 14, and a communication unit 15. The display control unit 11 includes a CPU, and the display storage unit 12 includes a semiconductor memory. The operation unit 14 is configured to output an operation signal to the display control unit 11, and the operation signal corresponds to an input operation. The communication unit 15 is configured to communicate with external devices, for example. The display unit 13 is, for example, a display device such as a liquid crystal display. A content displayed on a display screen of the display unit 13 is controlled by the display control unit 11. The information code display system 1 and the information code display device 10 may include at least one processor. The processor executes a display method provided in this disclosure, which includes multiple steps. The processor may be provided by a microcontroller circuit that executes a program recorded in a storage medium such as a semiconductor memory, or a gate array circuit that includes a logic circuit corresponding to the program. The processor may be arranged inside the information code display device 10, arranged remotely from the information code display device 10, or distributed throughout the information code display system 1. The display control unit 11 shown in FIG. 2 includes the processor arranged in one of these manners.

In the information code display device 10 configured in such manner, an information code generation process is executed by the display control unit 11 in response to a predetermined operation on the operation unit 14, for example. An information code generated in this process is formed of light color cells and dark color cells arranged so that predetermined data can be optically read out. The generated information code is displayed on the display screen of the display unit 13 through an information code display process executed by the display control unit 11 at a predetermined timing. In addition, in the information code display process, at a predetermined timing, an information code that has been generated in advance and stored in the display storage unit 12 may be displayed, or an information code received from outside via the communication unit 15 may be displayed. For example, the display method provided by the information code display system 1 may comprise a generation step of generating the information code, and a display step of displaying the information code on the display unit 13. In this case, the generating step may be performed remotely by a processor of a device separated from the information code display device 10.

In particular, in the information code display process of the present embodiment, the information code is displayed on the display screen of the display unit 13 by gradually changing a luminance of a light color display area in which light color cells are to be displayed and a luminance of a dark color display area in which dark color cells are to be displayed. The specific display manner of the information code will be described later.

The event camera 20 includes an imaging element that outputs event data corresponding to a pixel that has changed in luminance when light is received. The event data includes two-dimensional point position data by which the position of the pixel is identified. The image data processing device 30 obtains multiple event data output within a predetermined period of time, and plots the two-dimensional point data of the multiple event data individually on a predetermined plane as point position information. In this way, image data of an imaging target that has changed in luminance is generated. The predetermined period of time may be a fixed period of time or a variable period of time.

When an information code is captured by the event camera 20 having such configuration, if the information code is stationary (i.e., there is no relative movement between the information code and the event camera 20), there is no change in luminance and therefore no event data is output. As a result, an image of the information code may not be captured in a readable manner. For example, as shown in FIG. 3, a barcode C displayed on a display screen P cannot be read when it is captured by the event camera 20 that is not moving relative to the barcode C.

Therefore, in the information code display process executed by the display control unit 11 in the present embodiment, the display unit 13 is controlled to increase the luminance of the light color display area in which the light color cells are to be displayed from a predetermined initial display screen P0 on the display unit 13, and decrease the luminance of the dark color display area in which the dark color cells are to be displayed.

Figure 3:
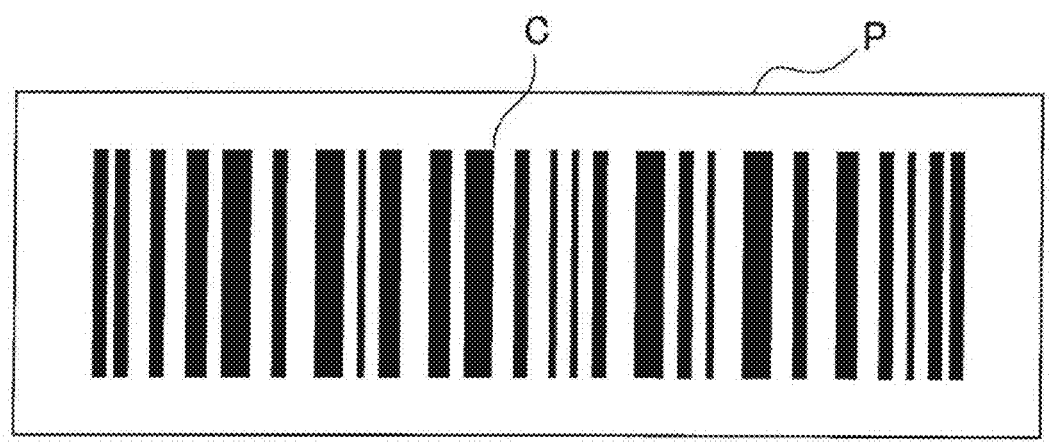
FIG. 3 is a diagram illustrating a barcode simply displayed on a display screen of the information code display device.
Figure 4:
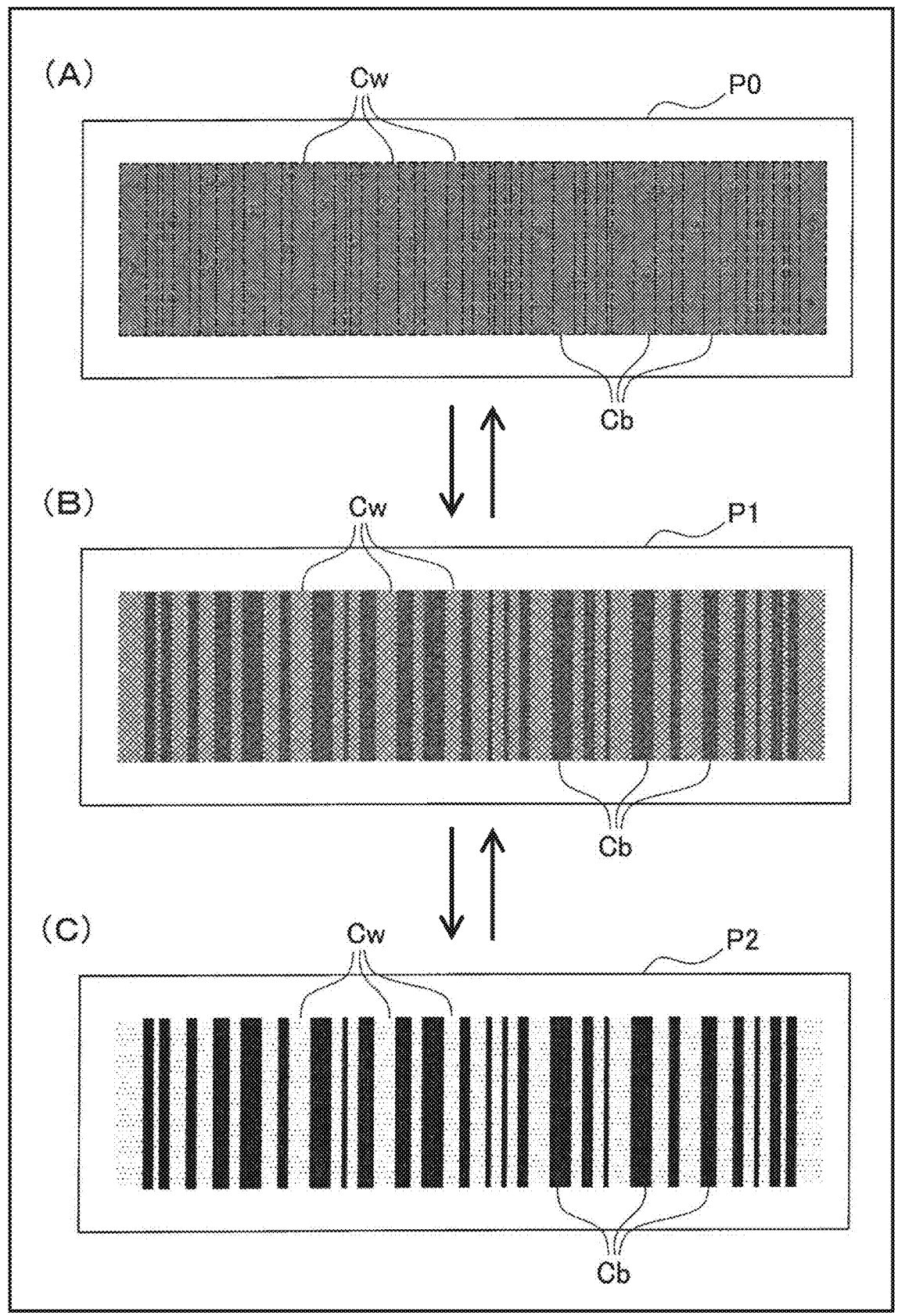
FIG. 4 is a diagram illustrating the display screen on which the barcode shown in FIG. 3 is displayed so that its luminance changes, according to the first embodiment.

For example, when the barcode C shown in FIG. 3 is captured by the event camera 20, the luminance is changed as shown in FIG. 4 in the information code display process. The state (A) shows the initial display screen in which the light color display area and the dark color display area are displayed in the same gray color. The state (B) shows a display screen in the middle of gradually increasing the luminance of the light color display area from the state (A) and gradually decreasing the luminance of the dark color display area from the state (A). The state (C) shows a display screen in which the luminance of the light color display area has been gradually increased from the state (B) and the luminance of the dark color display area has been gradually decreased from the state (B).

As shown in the state (A) of FIG. 4, the initial display screen P0 first displays the light color display area and the dark color display area with a luminance equivalent to the same gray color (i.e., a color intermediate between white and black). In this display state, the light color display area and the dark color display area cannot be visually distinguished. In each state (A), (B), and (C) of FIG. 4, the light color display area is indicated by the numeral Cw, and the dark color display area is indicated by the numeral Cb. The light color display area and the dark color display area in the initial display screen P0 are displayed with a common luminance that is common to both the light color display area and the dark color display area. The common luminance is set between the highest luminance and the lowest luminance. The common luminance may be an intermediate luminance set halfway between the highest luminance of the light color display area and the lowest luminance of the dark color display area.

Then, as can be seen from the display screen P1 shown in the state (B) of FIG. 4 and the display screen P2 shown in the state (C) of FIG. 4, the luminance of the light color display area is gradually increased, and the luminance of the dark color display area is gradually decreased. When the difference in luminance between the light color display area and the dark color display area exceeds a predetermined luminance difference threshold, the two can be visually distinguished from each other.

Figure 15:
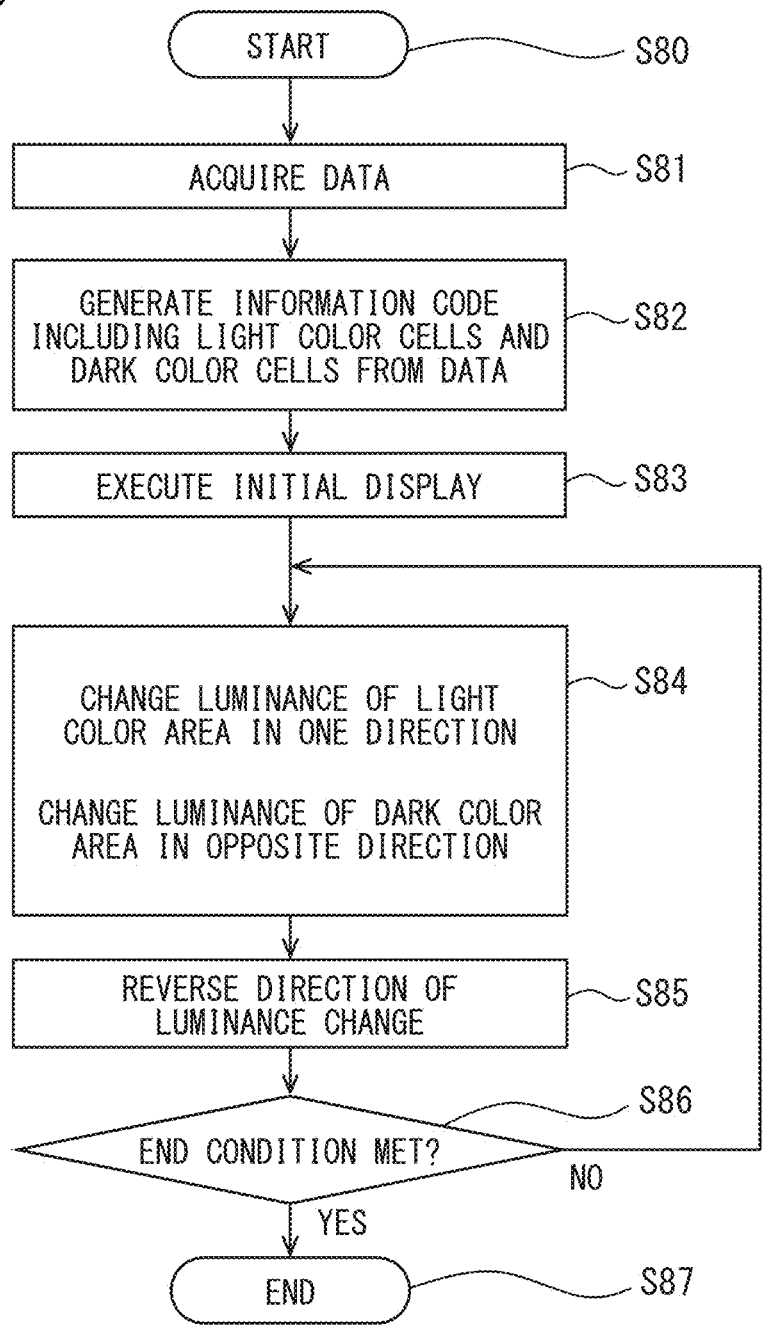
FIG. 15 is a flowchart illustrating a display process according to the first embodiment.

A flowchart of a code display process by the information code display device 10 will be described with reference to FIG. 15. When the flow starts (S80), first, data of the barcode C to be displayed is acquired (S81). Based on this data, the widths of the light color display areas Cw and the dark color display areas Cb of the barcode C are determined, and an information code is generated (S82). In the case of QR code D described later, the positions of the white cells 202 and the black cells 201 are determined to create an information code.

Next, the initial display screen P0 of the created information code is displayed on the display unit 13 (S83). This display of the initial screen (S83) continues for a predetermined time, for example, 10 microseconds. After the predetermined time has elapsed, a display screen is created in which the luminance of the light color display area Cw is increased from a luminance of the initial display screen P0 by a predetermined luminance threshold value or more and the luminance of the dark color display area Cb is decreased from the luminance of the initial display screen P0 by the predetermined luminance threshold value or more, and this display screen is displayed on the display unit 13 (S84). This display is also continued for the predetermined period of time. Then, after the predetermined time has elapsed, a display screen is created in which the luminance of the light color display area Cw is further increased by a predetermined luminance threshold value or more and the luminance of the dark color display area Cb is further decreased by the predetermined luminance threshold value or more, and this display screen is displayed on the display unit 13 (S84). That is, in FIG. 15, the creation and display of the information code that has changed in luminance is collectively included in step S84. However, the step S84 includes a determination step of whether the predetermined time has elapsed. The step S84 further includes a change step of changing the luminance when the predetermined time has elapsed, and a display step of displaying the information code that has changed in luminance. If there are thirty luminance changes from the initial display screen P0 until the luminance of the light color display area Cw reaches the highest luminance and the luminance of the dark color display area Cb reaches the lowest luminance, the step S84 is repeated thirty times.

Next, it is determined whether the luminance of the light color display area Cw has reached the highest luminance or the luminance of the dark color display area Cb has reached the lowest luminance (S85). According to the setting, the timing at which the luminance of the light color display area Cw becomes the highest luminance and the timing at which the luminance of the dark color display area Cb becomes the lowest luminance are coincide with each other. However, for some reason, the timing at which the luminance of the light color display area Cw becomes the highest luminance and the timing at which the luminance of the dark color display area Cb becomes the lowest luminance may differ. In this case, the earlier one of timings: when the luminance of the light color display area Cw becomes the highest luminance and when the luminance of the dark color display area Cb becomes the lowest luminance, may be used in the determination at step S85. When the timing arrives, the direction of the luminance change is reversed (S85).

Next, it is determined whether an end condition is met (S86), and when the end condition is not met, the steps S84 and S85 are repeated. When the end condition is not met and the process returns to step S84, the direction of change in luminance is reversed in the next step S84. That is, a display screen is created in which the luminance of the light color display area Cw is decreased by the predetermined luminance threshold value or more and the luminance of the dark color display area Cb is increased by the predetermined luminance threshold value or more, and this display screen is displayed on the display unit 13 (S84). The display of the display screen is continued for the predetermined period of time, which is the same as in the previous step S84.

Similarly, when the end condition is not met and the process returns to step S85, the condition for reversing the direction of change in luminance is different in the next step S85. In the next step S85, the condition for reversing the direction of change in luminance is that the luminance of the light color display area Cw and the luminance of the dark color display area Cb become equal (S85). However, the condition for reversing the direction of change in luminance (S85) may be that the difference between the luminance of the light color display area Cw and the luminance of the dark color display area Cb is equal to or smaller than a predetermined luminance difference.

The end condition (S86) includes an example in which the event camera 20 recognizes a luminance change and a recognition end signal is transmitted from the image data processing device 30 to the information code display device 10. When the end condition is met, the flow ends (S87).

As described above, a display state is realized, in which the luminance is changed emphatically in the lighter/darker direction in the light color display area Cw and the dark color display area Cb. In this display state, the event camera 20, whose imaging area is the display screen of the display unit 13, generates event data of a positive luminance change in pixels that receive light from the light color display area Cw, and event data of a negative luminance change in pixels that receive light from the dark color display area Cb. Therefore, the positions of the pixels where the positive luminance change occurs and the positions of the pixels where the negative luminance change occurs can cause determination of a positional relationship between the light color display area Cw and the dark color display area Cb, i.e., a positional relationship between the light color cells and the dark color cells. Therefore, image data readable by the event camera 20 can be generated from the barcode C, which is an array of the light color cells and the dark color cells. Furthermore, an image of the barcode C readable by the event camera 20 can be displayed on the display unit 13 of the information code display device 10. The change in luminance in the light color display area Cw and the change in luminance in the dark color display area Cb are generated repeatedly. In the drawings, the process of repetitive change is indicated by arrows. Note that the display screen P1 in the state (B) of FIG. 4 is one example state within a predetermined luminance change. As described above, in reality, a large number of display screens that vary in luminance by the predetermined luminance change threshold between the initial display screen P0 in the state (A) and the display screen P2 in the state (C) are displayed on the display unit 13 consecutively.

Figure 6:
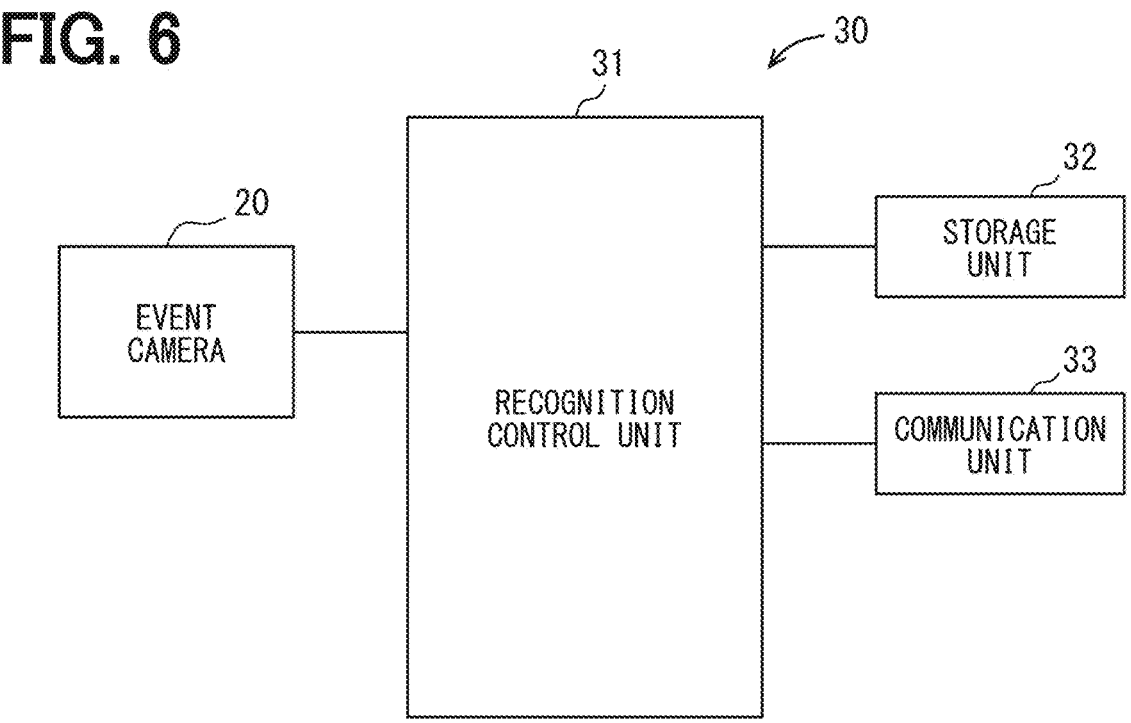
FIG. 6 is a block diagram illustrating a schematic configuration of a reading device of an event camera.

As shown in FIG. 6, the image data processing device 30 for decoding the barcode C includes a recognition control unit 31 including a CPU, and a recognition storage unit 32 including a semiconductor memory. The recognition communication unit 33 is responsible for communication between the recognition control unit 31 and the event camera 20. The image data processing device 30 may include at least one processor. The processor executes a reading method provided in this disclosure, which includes multiple steps. The processor may be provided by a microcontroller circuit that executes a program recorded in a storage medium such as a semiconductor memory, or a gate array circuit that includes a logic circuit corresponding to the program. The processor may be arranged within the image data processing device 30, arranged remotely from the image data processing device 30, or distributed throughout the system. The recognition control unit 31 shown in FIG. 6 includes the processor arranged in one of these manners.

Figure 7:
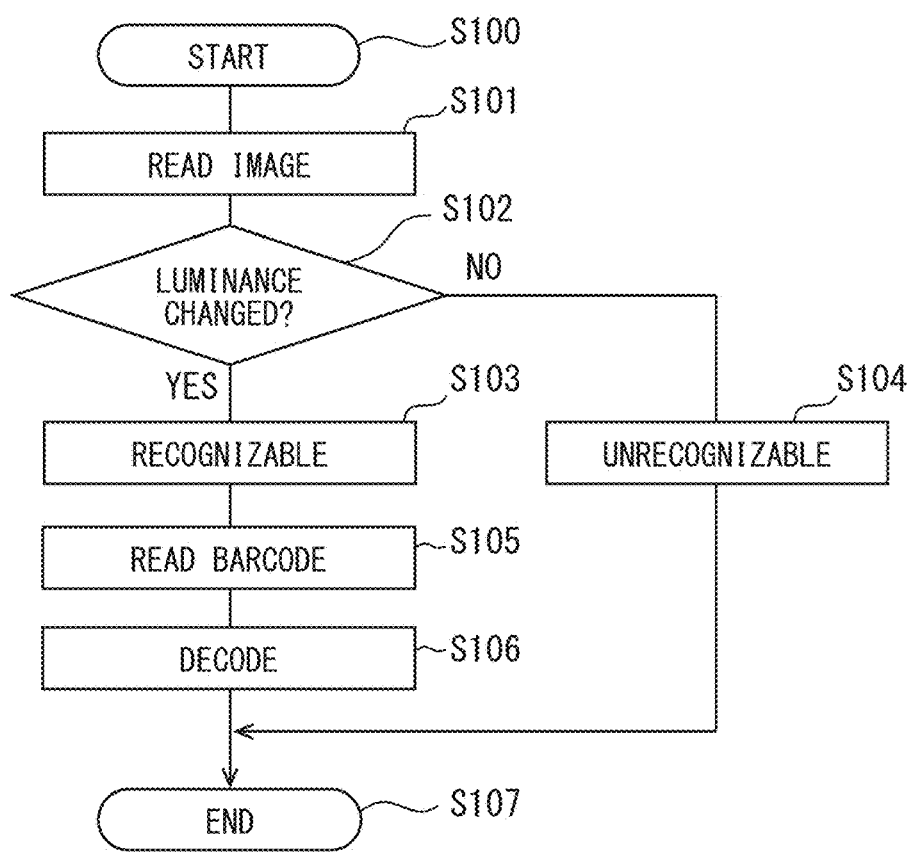
FIG. 7 is a flowchart illustrating determination whether recognition is possible, according to the first embodiment.

FIG. 7 shows the reading process by the image data processing device 30. The reading process will be described with reference to the flowchart of FIG. 7. The flow starts at step S100, and an image including a barcode C is read by the event camera 20 (S101). The event camera 20 determines whether a difference in luminance has occurred through obtaining a change in luminance of the barcode C (S102). In other words, if the luminance of the barcode C does not change, the event camera 20 cannot read the barcode C. Therefore, when there is a change in luminance, the barcode C is recognizable (S103). When there is no change in luminance, the barcode C is unrecognizable (S104). By utilizing this characteristic, the barcode C printed on paper or the barcode C displayed continuously on the display unit 13 can be determined to be unrecognizable. When the barcode C is recognizable, the barcode C is read (S105) and decoded (S106). When the barcode C has been decoded (S106) or when the barcode C is unrecognizable (S104), the flow ends (S107).

Accordingly, the information code display device 10 and the information code display system 1 are capable of displaying an information code that can be captured even by the event camera 20 when there is no relative movement between the event camera 20 and the information code. It is noted that "no relative movement" does not necessarily mean being completely still. This includes a state in which a user uses a display device such as a smartphone in a normal manner. For example, if the event camera 20 reads the event data in 100 microseconds, shifting of the display device by 10 centimeters per second causes a shift of the barcode C will be 0.01 millimeters. This shift is sufficiently smaller than the width of the barcode C. Therefore, the event camera 20 can reliably read the barcode C.

As a modification of the present embodiment, the light color display area Cw and the dark color display area Cb on the predetermined initial display screen P0 are not limited to being displayed with a luminance equivalent to an indistinguishable gray color. For example, the light color display area Cw and the dark color display area Cb on the initial display screen may be displayed to have a predetermined luminance difference (first luminance difference) such that the light color display area Cw and the dark color display area Cb are distinguishable, as in the display screen P2 illustrated in the state (C) of FIG. 4. In this case, by gradually changing the luminance of the light color display area Cw and the luminance of the dark color display area in the opposite directions, the light color display area Cw and the dark color display area Cb can be more accurately distinguished and viewed even on the initial display screen. The initial display screen may be an image illustrated in the state (A) of FIG. 4. In this case, humans cannot visually recognize the presence of the information code. Alternatively, the initial display screen may be an image illustrated in the state (C) of FIG. 4. In this case, humans can visually recognize the presence of the information code. The initial display image can selectively be any one of the states (A), (B), and (C) in FIG. 4. As described above, since the event camera 20 detects a change in luminance, the initial display screen P0 may be any display screen where the luminance change starts, regardless of the absolute value of the luminance.

When the light color display area Cw and the dark color display area Cb on the initial display screen are displayed to have the predetermined luminance difference (first luminance difference) to be distinguishable therebetween as in the state (C) of the display screen P2 in FIG. 4, an image can be captured by not only the event camera 20 but also a general camera (frame-based camera) different from the event camera 20 such that the light color display area Cw and the dark color display area Cb are distinguishable. As a result, convenience of the information code displayed on the screen of the display unit 13 can be improved. It should be noted that terms "distinguishable" and "indistinguishable" regarding the first luminance difference are consistent between human vision and recognition of the frame-based camera. In other words, if there is the first luminance difference between the light color display area Cw and the dark color display area Cb, the presence of the information code can be recognized by not only humans but also the frame-based camera.

Second Embodiment

Next, an information code display device and an information code display system according to a second embodiment of the present disclosure will be described with reference to the drawings.

The second embodiment differs from the first embodiment mainly in that luminance change in opposite directions in a light color display area Cw and a dark color display area Cb is repeated. Therefore, components that are substantially the same as those in the first embodiment will be assigned the same reference numerals, and descriptions thereof will be omitted.

The information code display device 10 may not be able to determine whether the information code displayed on the display screen of the display unit 13 has been captured in a readable manner by the event camera 20. In this case, when the gradually changed luminance of the light color display area Cw reaches its highest luminance or the luminance of the dark color display area reaches its lowest luminance, no change in luminance occurs and therefore no event is output. In this state where no event is output, the event camera 20 cannot capture an image of the information code, and the state where the information code cannot be captured will continue unless a change in luminance occurs.

Therefore, according to the present embodiment, the display control unit 11 executes the information code display process. In this process, when the luminance of the light color display area Cw, which has been gradually increased to be brighter, reaches its highest luminance or the luminance of the dark color display area Cb, which has been gradually decreased to be darker, reaches its lowest luminance, the luminance of the light color display area Cw is gradually decreased to be darker and the luminance of the dark color display area Cb is gradually increased to be brighter. Similarly, when the luminance of the light color display area Cw, which has been gradually decreased to be darker, reaches its lowest luminance or the luminance of the dark color display area Cb, which has been gradually increased to be brighter, reaches its highest luminance, the display unit 13 is controlled so that the luminance of the light color display area Cw is gradually increased to be brighter and the luminance of the dark color display area Cb is gradually decreased to be darker.

Figure 5:
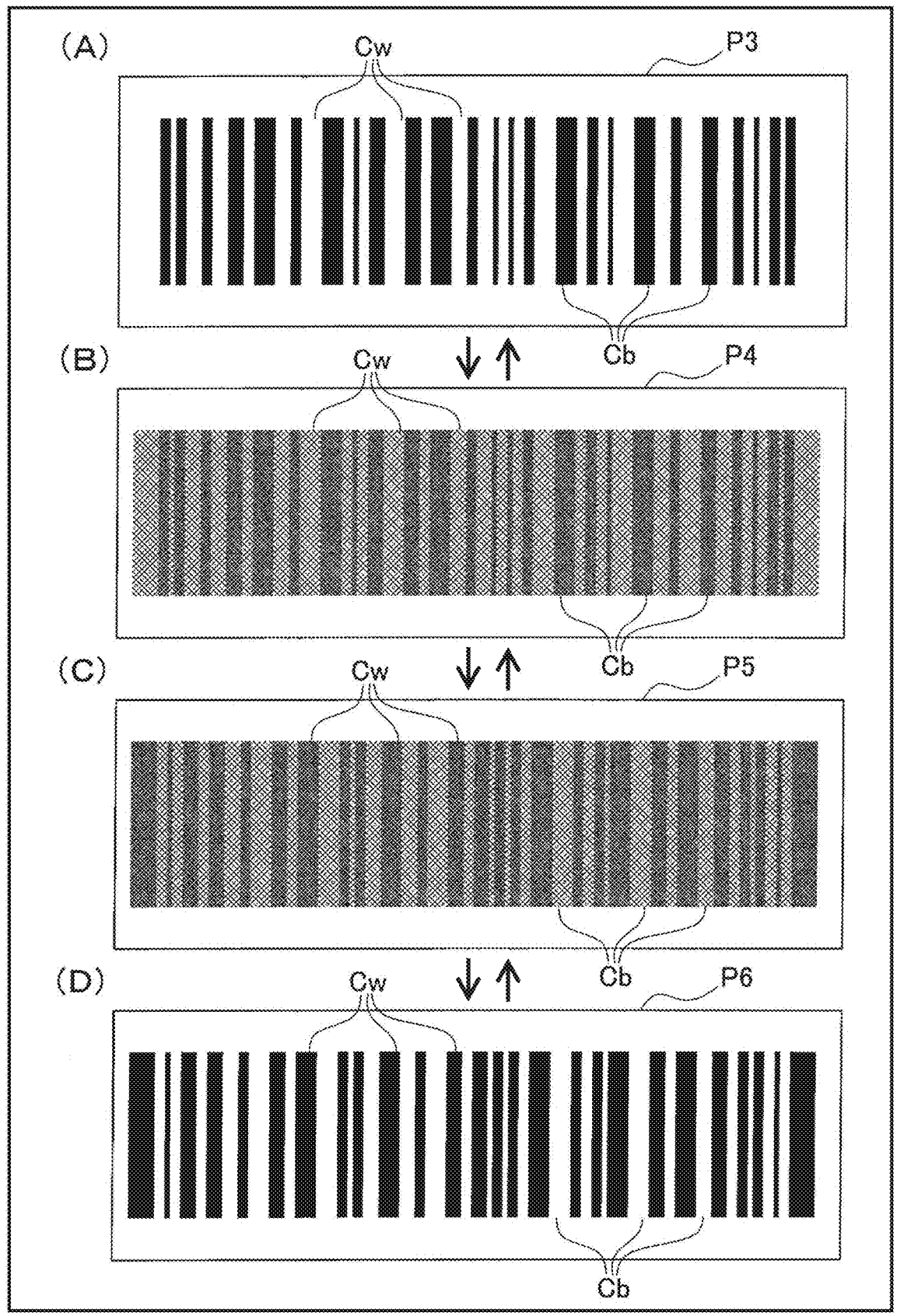
FIG. 5 is a diagram illustrating the display screen on which the barcode shown in FIG. 3 is displayed so that its luminance changes, according to a second embodiment.

For example, in the information code display process for displaying the barcode C shown in FIG. 3, the luminance is changed as shown in FIG. 5. A state (A) of FIG. 5 shows a display screen P3 in which the luminance of the light color display area Cw has reached the highest luminance and the luminance of the dark color display area Cb has reached the lowest luminance. A state (B) of FIG. 5 shows a display screen P4 in which the luminance of the light color display area Cw is gradually decreased from the state (A) to be gradually darker and the luminance of the dark color display area Cb is gradually increased from the state (A) to be gradually brighter. A state (C) of FIG. 5 shows a display screen P5 in which the luminance of the light color display area Cw is further gradually decreased from the state (B) to be gradually darker and the luminance of the dark color display area Cb is further gradually increased from the state (B) to be gradually brighter. A state (D) of FIG. 5 shows a display screen P6 in which the luminance of the light color display area Cw reaches the lowest luminance and the luminance of the dark color display area Cb reaches the highest luminance.

In the display screen P3 shown in the state (A) of FIG. 5, the luminance of the light color display area Cw, which has been gradually increased to be brighter, reaches its highest luminance and the luminance of the dark color display area Cb, which has been gradually decreased to be darker, reaches its lowest luminance. Then, in the display screen P4 shown in the state (B) of FIG. 5, the luminance of the light color display area Cw is gradually decreased to be darker and the luminance of the dark color display area Cb is gradually increased to be brighter. Thereafter, in the display screen P5 in the state (C) of FIG. 5, the luminance of the light color display area Cw is gradually decreased to be darker, and the luminance of the dark color display area Cb is gradually increased to be brighter. Finally, in the display screen P6 in the state (D) of FIG. 5, the luminance of the light color display area Cw, which is gradually decreased to be darker, reaches the lowest luminance, and the luminance of the dark color display area Cb, which is gradually increased to be brighter, reaches the highest luminance. Thereafter, the luminance of the light color display area is gradually increased to be brighter again, and the luminance of the dark color display area is gradually decreased to be darker again, thereby changing again into the display screen P5 in the state (C) of FIG. 5.

The luminance of the light color display area Cw repeatedly changes between the highest luminance shown in the state (A) of FIG. 5 and the lowest luminance shown in the state (D) of FIG. 5. The luminance of the dark color display area Cb repeatedly changes between the lowest luminance shown in the state (A) of FIG. 5 and the highest luminance shown in the state (D) of FIG. 5. The direction of luminance change in the light color display area Cw and the direction of luminance change in the dark color display area Cb are opposite to each other, that is, they intersect each other. The highest luminance of the light color display area Cw is equal to the highest luminance of the dark color display area Cb. The lowest luminance of the light color display area Cw is equal to the lowest luminance of the dark color display area Cb. The display screen P3 shown in the state (A) of FIG. 5 and the display screen P6 shown in the state (D) of FIG. 5 can be referred to inverted displays which are opposite from each other in luminance. The light color display area Cw and the dark color display area Cb changes in luminance so that their light and dark are inverted relative to each other.

According to the information code display process of the present embodiment, luminance changes in the opposite directions can be repeatedly produced in the light color display area Cw and the dark color display area Cb. Therefore, an image of the information code may be captured by the event camera 20, and the light color display area Cw and the dark color display area Cb may be inverted based on the obtained event information. Accordingly, a display state in which the information code can be captured in a readable manner can be appropriately maintained. That is, the barcode C is decoded based on the widths of the light color display area Cw and the dark color display area Cb. Therefore, even if the color of the light color display area Cw is not actually light, the barcode C can be decoded as long as it has a different lightness from the dark color display area Cb.

Third Embodiment

Next, an information code display device and an information code display system according to a third embodiment of the present disclosure will be described with reference to the drawings.

The third embodiment differs from the first embodiment mainly in that an information code is displayed in such a way that it can be captured by an event camera but cannot be captured by a general camera. Therefore, components that are substantially the same as those in the first embodiment will be assigned the same reference numerals, and descriptions thereof will be omitted.

In the present embodiment, the light color display area Cw and the dark color display area Cb on a predetermined initial display screen are set to have a luminance difference that is equal to or less than a predetermined luminance difference (second luminance difference) at which light and dark cannot be distinguished. A display control unit 11 executes an information code display process to control the display unit 13 to change the luminance of the light color display area Cw and the luminance of the dark color display area Cb within a range in which the difference between a highest luminance and a lowest luminance is equal to or less than the second luminance difference. Hereinafter, the highest luminance and the lowest luminance at which a luminance difference between the light color display area Cw and the dark color display area Cb are equal to or smaller than the second luminance difference at which light and dark cannot be distinguished from each other will be referred to as a limited highest luminance and a limited lowest luminance, respectively.

For example, on the display screen of the display unit 13 immediately after a start of the information code display process, the light color display area Cw and the dark color display area Cb are displayed at a luminance equivalent to the same gray color, as in the initial display screen P0 in the state (A) shown in FIG. 4. Thereafter, the luminance of the light color display area Cw is gradually increased to be brighter up to the limited highest luminance, and the luminance of the dark color display area Cb is gradually decreased to be darker up to the limited lowest luminance. When the luminance of the light color display area Cw becomes the limited highest luminance and the luminance of the dark color display area Cb becomes the limited lowest luminance, the luminance difference between the limited highest luminance and the limited lowest luminance is equal to or smaller than the second luminance difference. Therefore, when a general camera captures the image of this display state, the general camera is incapable of distinguishing between the light color display area and the dark color display area, and is incapable of generating readable image data. In the example of FIG. 4, a luminance difference on the initial display screen P0 in the state (A) is equal to or smaller than the luminance difference between the limited highest luminance and the limited lowest luminance.

In addition, the terms "distinguishable" and "indistinguishable" regarding the second luminance difference are difference between human vision and recognition of a frame-based camera. When there is the above-described first luminance difference between the light color display area Cw and the dark color display area Cb, the presence of the information code can be recognized by not only humans but also the frame-based camera. On the other hand, the second luminance difference is set to a level at which the presence of the information code cannot be recognized by the frame-based camera but can be recognized by humans. This is because if humans cannot recognize the information code, a user cannot intuitively understand the state of the event camera 20.

After reaching the limited highest luminance and the limited lowest luminance, the luminance of the light color display area Cw is gradually decreased to be darker from the limited highest luminance to the limited lowest luminance, and the luminance of the dark color display area Cb is gradually increased to be brighter from the limited lowest luminance to the limited highest luminance. Even when the luminance of the light color display area Cw reaches the limited lowest luminance and the luminance of the dark color display area Cb reaches the limited highest luminance, the general camera that captures this display state cannot distinguish between the light color display area and the dark color display area, and cannot generate readable image data. In the example of FIG. 4, the display screen P1 in the state (B) has the limited highest luminance and the limited lowest luminance.

On the other hand, since the light color display area Cw and the dark color display area Cb change in luminance in opposite directions, the event camera 20 can identify a positional relationship between the light color display area Cw and the dark color display area Cb even if their luminances change between the limited lowest luminance and the limited highest luminance. Therefore, even if the information code cannot be recognized by the frame camera, the event camera 20 can generate readable image data. That is, in the example of FIG. 4, there are many steps in changes in luminance between the initial screen of the state (A) and the display screen P1 of the state (B), during which the event camera 20 can read the image data of the barcode C.

In this way, while light color cells and dark color cells can be accurately recognized in images captured by the event camera 20, light color cells and dark color cells are difficult to be accurately recognized in images captured by a general camera (frame-based camera) that is different from the event camera 20. Therefore, since an information code that can be easily recognized and captured only by the event camera 20 can be displayed, the information code displayed on the screen can be used as a highly confidential information code for authenticity determination, etc.

In the example of FIG. 4, between the display screen P1 in the state (B) and the display screen P2 in the state (C), the barcode C can be recognized not only by the event camera 20 but also by a general camera. When increasing confidentiality, the luminance may be changed between the initial display screen P0 in the state (A) of FIG. 4 and the display screen P1 in the state (B) of FIG. 4. When increasing visibility, the luminance may be changed between the display screen P1 in the state (B) of FIG. 4 and the display screen P1 in the state (C) of FIG. 4.

Fourth Embodiment

Figure 8:
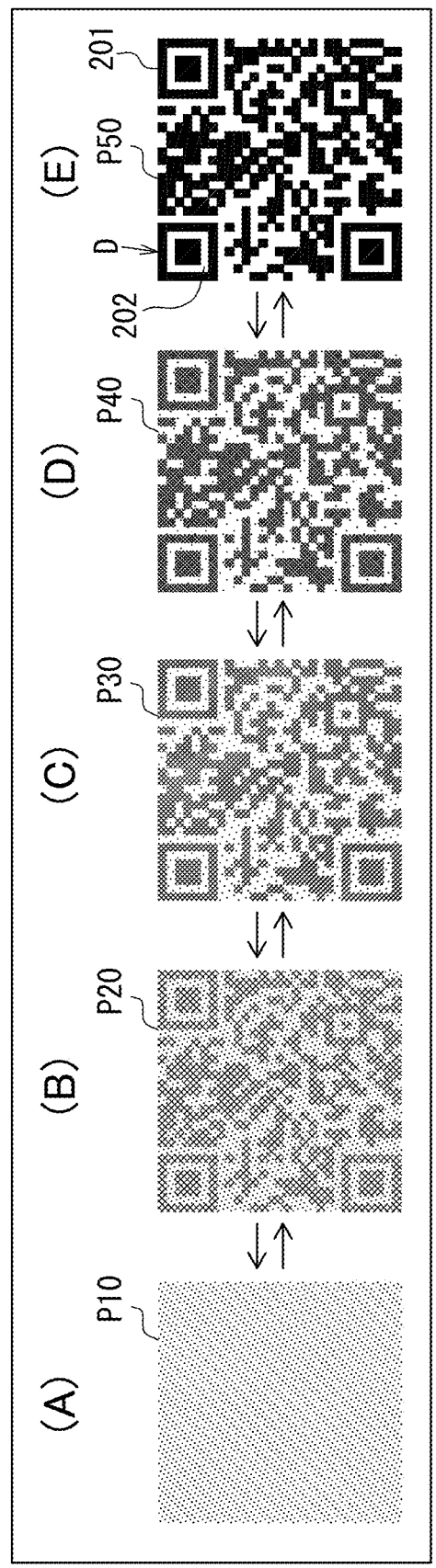
FIG. 8 is a diagram illustrating the display screen on which a QR code (registered trademark) is displayed so that its luminance changes, according to a fourth embodiment.

The above explanations have been given using the barcode C, but the present disclosure can also be used to read a QR code D as described above. Thus, the present disclosure will be explained again using the example of the QR code D. FIG. 8 shows the change in luminance of the QR code D. The luminance varies in 256 steps, with luminance 0 being black and luminance 255 being white. A display screen P10 in a state (A) of FIG. 8 shows a middle gray and has a luminance of 127. In the state (A) of FIG. 8, the black cells 201 and the white cells 202 all have the same luminance of 127. A display screen P50 in a state (E) of FIG. 8 is in a state where the luminance of the black cells 201 is 0 and the luminance of the white cells 202 is 255. Display screens P20, P30, and P40 in states (B), (C), and (D) of FIG. 8 indicate luminance levels between the states (A) and (E).

Figure 9:
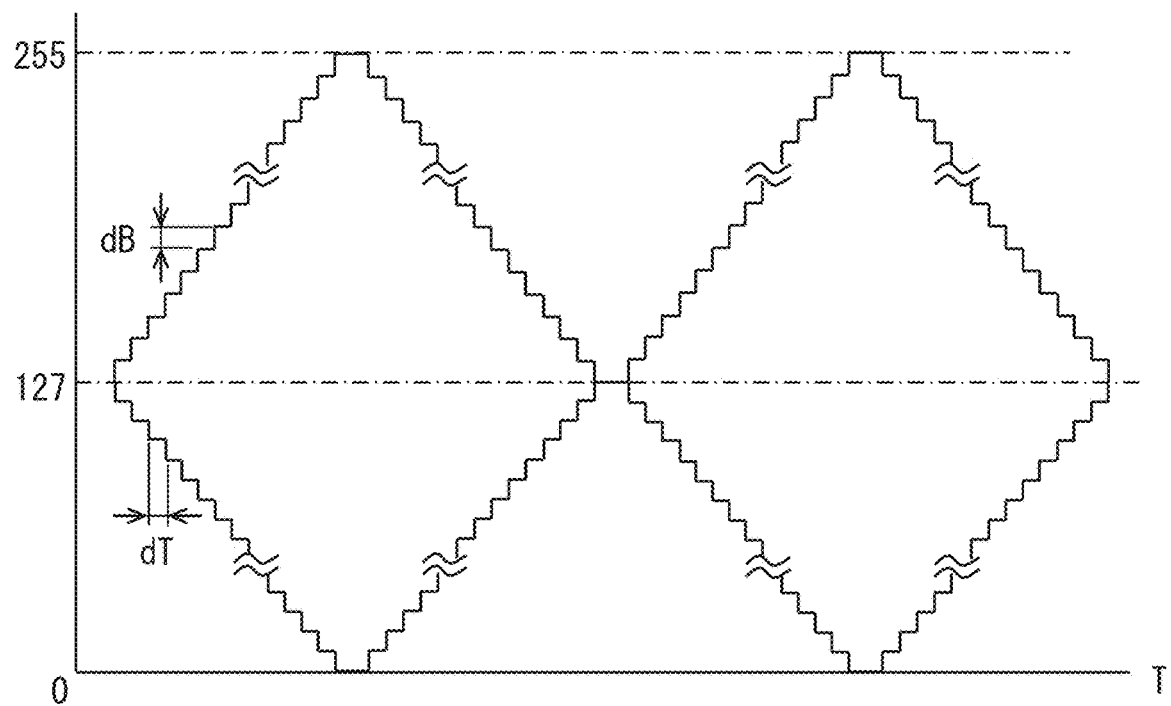
FIG. 9 is a diagram illustrating change in luminance according to the fourth embodiment.

The luminance changes over time as shown in FIG. 9. In the example of FIG. 9, a differential time dT is set to 10 microseconds, and a differential luminance dB is set to 2. That is, the luminance is changed by 2 every 10 microseconds. Therefore, in FIG. 8, it takes 640 microseconds to transition from the display screen P10 in the state (A) to the display screen P50 in the state (E), and the QR code D appears to a user in the state (C) of FIG. 8. In this example, the luminance in state (C) of FIG. 8 is set as the first luminance, which is recognizable by the user and can be captured by a general camera (frame-based camera).

The luminance differential dB may be appropriately selected. Although the event camera 20 is capable of reading a luminance differential dB about 2, the readable luminance differential may be set to a larger value in order to prevent erroneous recognition due to variations in luminance of the display unit 13. For example, the luminance differential dB may be 10, in other words, the luminance may be changed by 10 every 10 microseconds.

The display method provided by the information code display device 10 typically involves changing the luminance of the display of the information code in stages over time. However, this does not exclude cases where the luminance is continuously changed through analog processing of a signal. Since the image data processing device 30 checks the change in luminance at predetermined time intervals, the change in luminance can be checked even for a signal that changes continuously.

Furthermore, in the light color display area Cw, as long as the white cells 202 have a luminance change in the opposite direction to that of the black cells 201, the white cells may have the same value or different values in luminance. On the other hand, in the dark color display area Cb, as long as the black cells 201 have a luminance change in the opposite direction to that of the white cells 202, the black cells may have the same value or different values in luminance.

Fifth Embodiment

Figure 10:
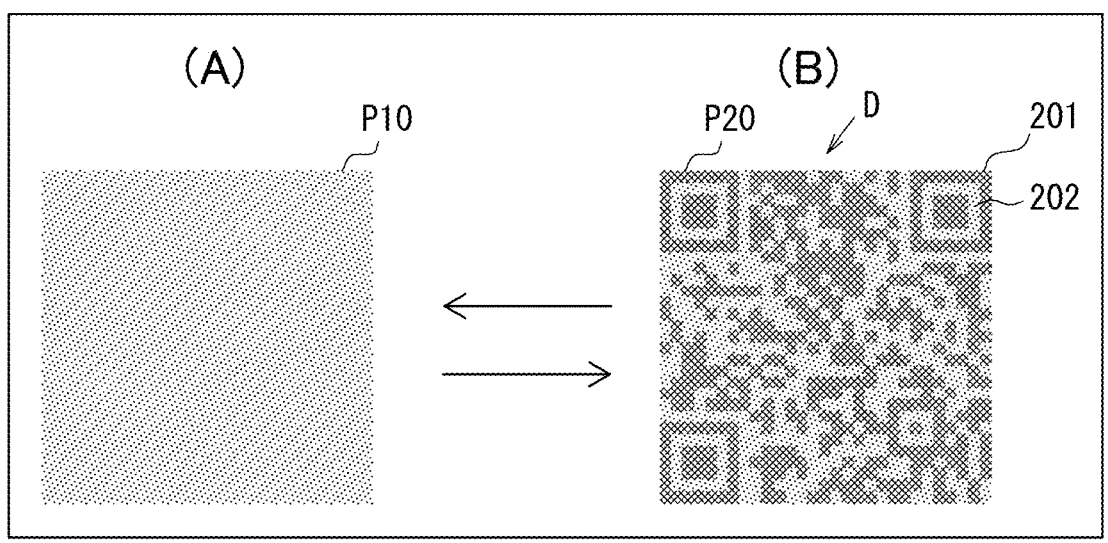
FIG. 10 is a diagram illustrating the display screen on which the QR code (registered trademark) is displayed so that its luminance changes, according to a fifth embodiment.

In a fifth embodiment, as shown in FIG. 10, switching is executed between a middle gray of a display screen P10 in a state (A) and a display screen P20 in a state (B). In the display screen P20 in the state (B) of FIG. 10, the luminance has been changed by 25 percent, i.e., the luminance of the black cell 201 has been reduced by 32 from 127 to 95. Similarly, the luminance of the white cell 202 increases by 32 from 127 to 159.

Figure 11:
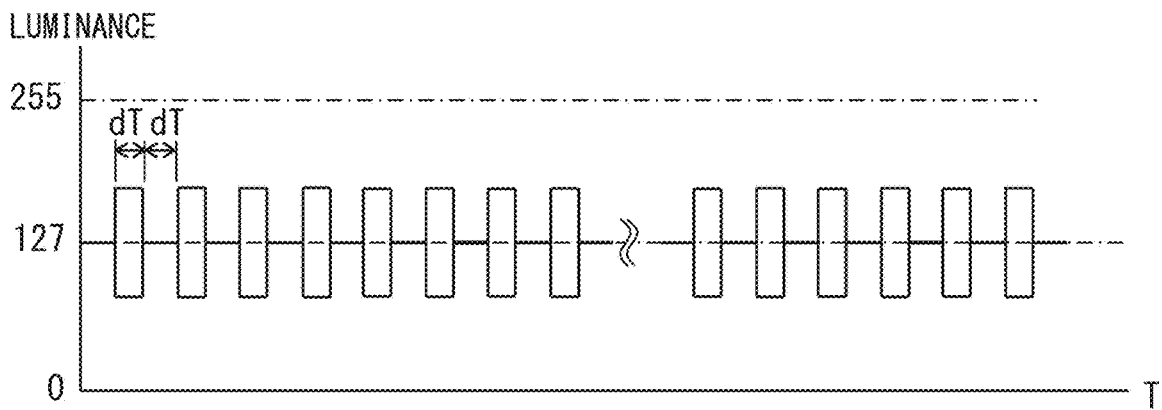
FIG. 11 is a diagram illustrating change in luminance according to a fifth embodiment.

This switching is repeated every 10 microseconds as shown in FIG. 11. As a result, what a user sees is a display between the display screen P10 in the state (A) and the display screen P20 in the state (B) in FIG. 10. This luminance is a second luminance, and a general camera cannot capture an image of the QR code. The differential time dT for switching the luminance can also be set appropriately. 10 microseconds is just an example, and a longer or shorter time may be used.

Sixth Embodiment

Figure 12:
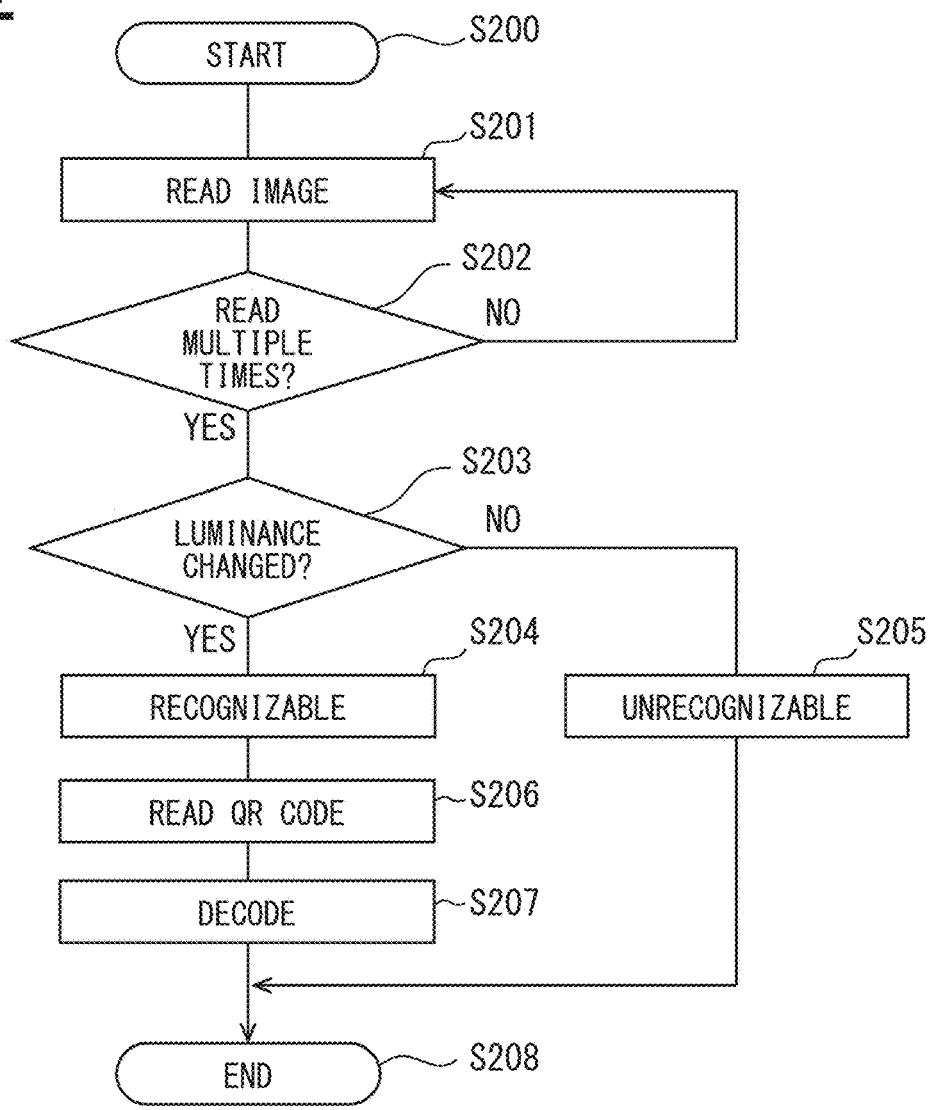
FIG. 12 is a flowchart illustrating determination whether recognition is possible, according to a sixth embodiment.

Even with a QR code D printed on paper, its luminance may vary depending on lighting conditions. Furthermore, the luminance of the QR code D displayed as a still image on the display unit 13 may also vary when the display unit 13 is turned on and off. In that case, there is a possibility that the QR code D will be read by mistake by the event camera 20 that is not actually capable of reading the QR code. In the sixth embodiment, in order to avoid this erroneous reading, it is determined whether the luminance has changed multiple times. The control flow will be described with reference to the flowchart of FIG. 12.

When the control flow starts (S200), the event camera 20 reads an image including a QR code D (S201). More specifically, it is determined whether the luminance of the QR code D has changed (S201). Next, it is determined whether the luminance change of this QR code D is sufficient to be detected multiple times (S202). For example, if the luminance is changed every 10 microseconds, in step S202, it is determined whether 100 microseconds have elapsed. Next, it is determined whether a predetermined number of luminance changes have been confirmed during this elapsed time (S203). For example, it is determined whether the event camera 20 has detected seven or more luminance changes within 100 microseconds. When the predetermined number of luminance changes are detected, the QR code D can be recognized as being correctly displayed (S204). When the luminance change is not detected the predetermined number of times, it is assumed that a luminance change has occurred by chance for some reason, and recognition is not performed (S205). When the QR code D is recognizable (S204), the QR code D is read (S206) and the QR code D is decoded (S207). Once the QR code D has been decoded (S207) or it has been determined that the QR code D is unrecognizable (S205), the control flow ends (S208).

Seventh Embodiment

Figure 13:
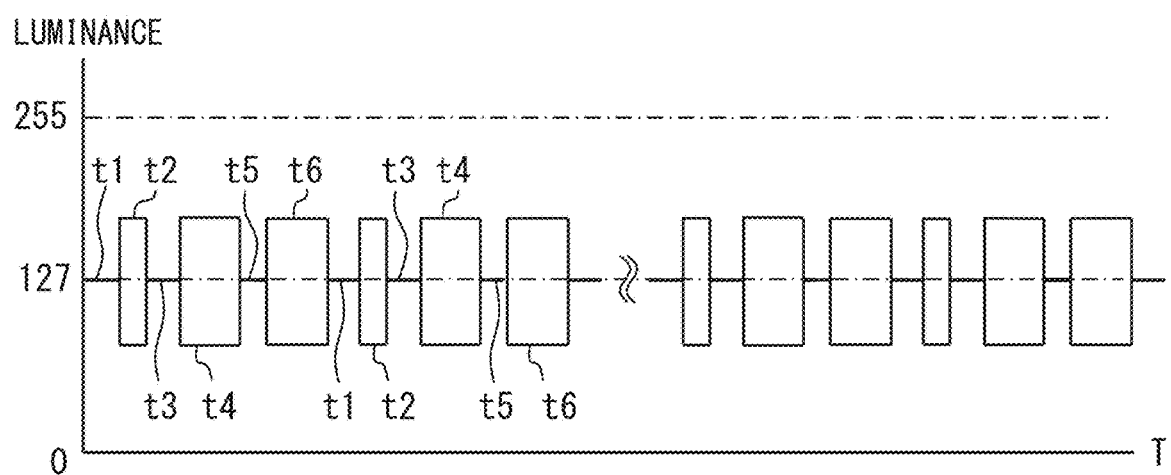
FIG. 13 is a diagram illustrating a change in luminance of the QR code according to a seventh embodiment.

A malicious person may read a stationary QR code D and alternately display the read QR code D and a gray image, causing the event camera 20 to read the QR code D that should not be able to be authenticated. In a seventh embodiment, in order to prevent such a situation, the luminance of the QR code D is changed in a specific pattern. In the example of FIG. 11, the time differential dT for luminance change is set to 10 microseconds, and the display screen P10 in the state (A) of FIG. 10 and the display screen P20 in the state (B) of FIG. 10 are simply displayed repeatedly every 10 microseconds. In contrast to this, in the seventh embodiment, the pattern of luminance change is made complex to provide a special aspect. In the example of FIG. 13, after maintaining an intermediate color at luminance of 127 for 10 microseconds (t1), light and dark colors, i.e., a light color at luminance of 159 and a dark color at luminance of 95, are maintained for 10 microseconds (t2). Then, the light and dark colors and the intermediate color are displayed alternately for 10 microseconds (t3), 20 microseconds (t4), 10 microseconds (t5), and 20 microseconds (t6). When the luminance change in this special pattern cannot be detected, authentication will not be executed.

Figure 14:
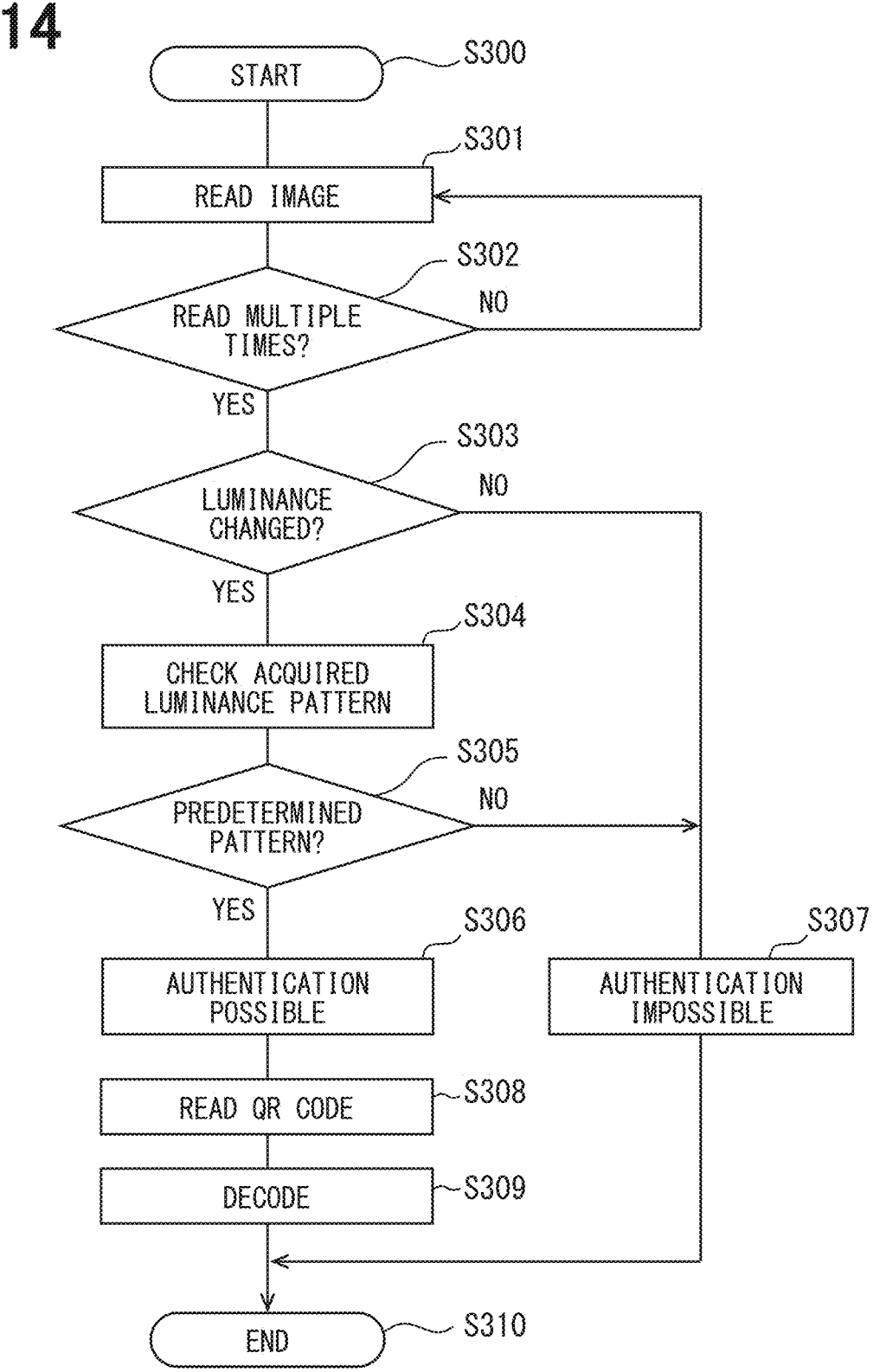
FIG. 14 is a flowchart illustrating determination whether authentication is possible, according to the seventh embodiment.

The authentication flow will be described with reference to the flowchart of FIG. 14. When the flow starts (S300), the event camera 20 reads an image including a QR code D (S301). Next, it is determined whether the luminance change of this QR code D is sufficient to be detected multiple times (S302). When changing the luminance in the pattern of FIG. 13, it takes 80 microseconds for one pattern, so in step S302 it is determined whether 160 microseconds have elapsed. As in the sixth embodiment described above, the reading of the QR code D is determined based on whether the luminance has changed (S303).

Next, the pattern of the luminance change acquired during this elapsed time is identified (S304). Then, it is determined whether the event camera 20 has detected a luminance change of the predetermined pattern during this elapsed time (S305). When the predetermined pattern of luminance change is detected, it is determined that the QR code D is being displayed correctly and authentication is possible (S306). When the predetermined pattern of luminance change cannot be detected, it is assumed that the code may be some kind of fraudulent code, and authentication is not executed (S307). When authentication is determined to be possible, the QR code D is read (S308), and the read QR code D is decoded (S309). After confirming that the QR code D can be decoded or that the QR code D cannot be read, the control flow ends (S310).

It should be noted that the pattern of 10 microseconds, 10 microseconds, 10 microseconds, 20 microseconds, 10 microseconds, and 20 microseconds is merely an example, and various patterns can be used. The event camera 20 can only grasp the change in luminance, and cannot determine the absolute value of the luminance. Therefore, the predetermined pattern is specified by time intervals of the luminance change, not by the absolute value of the luminance. For example, the luminance change pattern can be changed by changing a frequency at which the luminance changes. In the example of FIG. 11, the luminance is changed every 10 microseconds, but the luminance change pattern may be changed by changing the luminance change frequency, such as every 5 microseconds or every 15 microseconds. As described above, even if the absolute value of the luminance is changed, it cannot be detected by the event camera 20. However, in the information code display device 10, it is possible to change the luminance change pattern by changing the absolute value of the luminance. Furthermore, in the information code display device 10, it is also possible to change the luminance of the black cells 201 and the luminance of the white cells 202 for each pixel constituting the cell. In this case, the event camera 20 (image data processing device 30) captures images at predetermined time intervals, and checks whether the luminance change pattern has changed based on whether there has been a luminance change during that time intervals.

Note that the present disclosure is not limited to each embodiment or the like, and may be implemented as follows, for example.

(1) The event camera 20 is not limited to being configured to output image data such as an information code generated from obtained event data to the image data processing device. The event camera 20 may be configured to output data of event that has occurred to the image data processing device. In this case, the image data processing device generates image data such as an information code using the event data acquired from the event camera 20.

(2) In the information code display process, the barcode C is not limited to being displayed on the screen by gradually changing the luminance of the light color display area and the dark color display area. The information code display process may also display other types of one-dimensional or two-dimensional codes, such as QR codes, data matrix codes, maxicodes, etc., on the screen by gradually changing the luminance of the light color display area and dark color display area to display the information code on the screen. Even in such a display state, the event camera 20 can determine the positional relationship between the light color display area and the dark color display area, i.e., the positional relationship between the light color cells and the dark color cells, based on the positions of pixels where a positive luminance change occurs and the positions of pixels where a negative luminance change occurs. Then, the event camera 20 can generate readable image data from the information code formed by the arrangement of the light color cells and dark color cells.

(3) The information code display device 10 is not limited to the stationary display device, and may be a portable display device.

What is claimed is:

1. An information code display device for displaying an information code in which light color cells and dark color cells are arranged, the information code display device comprising:
    a display unit having a screen on which the information code is to be displayed; and
    a display control unit configured to control a display content displayed on the display unit, wherein
    the display control unit is configured to control the display unit to
        gradually change a luminance of a light color display area, in which the light color cells are to be displayed, from a luminance of a predetermined initial display screen in a certain direction, and
        gradually change a luminance of a dark color display area, in which the dark color cells are to be displayed, from the luminance of the predetermined initial display screen in an opposite direction to the certain direction.

2. The information code display device according to claim 1, wherein
    the display control unit is configured to control the display unit to:
        gradually change the luminance of the light color display area in the opposite direction and gradually change the luminance of the dark color display area in the certain direction in response to either a highest luminance or a lowest luminance being reached by the luminance of the light color display area that has been gradually changed in the certain direction or the luminance of the dark color display area that has been gradually changed in the opposite direction, and
        gradually change the luminance of the light color display area in the certain direction and gradually change the luminance of the dark color display area in the opposite direction in response to either the highest luminance or the lowest luminance being reached by the luminance of the light color display area that has been gradually changed in the opposite direction or the luminance of the dark color display area that has been gradually changed in the certain direction.

3. The information code display device according to claim 1, wherein
    the light color display area and the dark color display area on the predetermined initial display screen are set to have a first luminance difference to be distinguishable from each other in brightness.

4. The information code display device according to claim 1, wherein
    the light color display area and the dark color display area on the predetermined initial display screen are set to have a luminance difference that is equal to or less than a second luminance difference at which the light color display area and the dark color display area are indistinguishable from each other in brightness, and
    the display control unit is configured to control the display unit to change the luminance of the light color display area and the luminance of the dark color display area within a range between a highest luminance and a lowest luminance, a luminance difference between the highest luminance and the lowest luminance being less than the second luminance difference.

5. An information code display system comprising:
    an information code display device according to claim 1;
    an event camera including an imaging element configured to output event data corresponding to a pixel that has changed in luminance via receiving light, the event data including two-dimensional point data by which a position of the pixel is identified; and
    an image data processing device configured to process image information of the event camera, wherein
    the event camera is configured to capture the information code displayed on the information code display device.

6. The information code display system according to claim 5, wherein
    the image data processing device is configured to enable predetermined authentication based on the event camera detecting a luminance change in the light color display area and the dark color display area multiple times.

7. The information code display system according to claim 5, wherein the display control unit is configured to create a specific change pattern in luminance by controlling the luminance of the light color display area and the luminance of the dark color display area, and the image data processing device is configured to enable predetermined authentication based on the event camera detecting the specific change pattern in luminance.

8. An information code display device for displaying an information code in which light color cells and dark color cells are arranged, the information code display device comprising:

a display unit having a screen on which the information code is to be displayed; and at least one processor and at least one memory storing computer program code, wherein the at least one memory and the computer program code are configured, with the at least one processor, to cause the display unit to gradually change a luminance of a light color display area, in which the light color cells are to be displayed, from a luminance of a predetermined initial display screen in a certain direction, and gradually change a luminance of a dark color display area, in which the dark color cells are to be displayed, from the luminance of the predetermined initial display screen in an opposite direction to the certain direction.

* * * * *